June 24, 1930.　　　F. A. LITTER　　　1,767,384
BEARING BORING APPARATUS
Filed April 21, 1926　　2 Sheets-Sheet 1
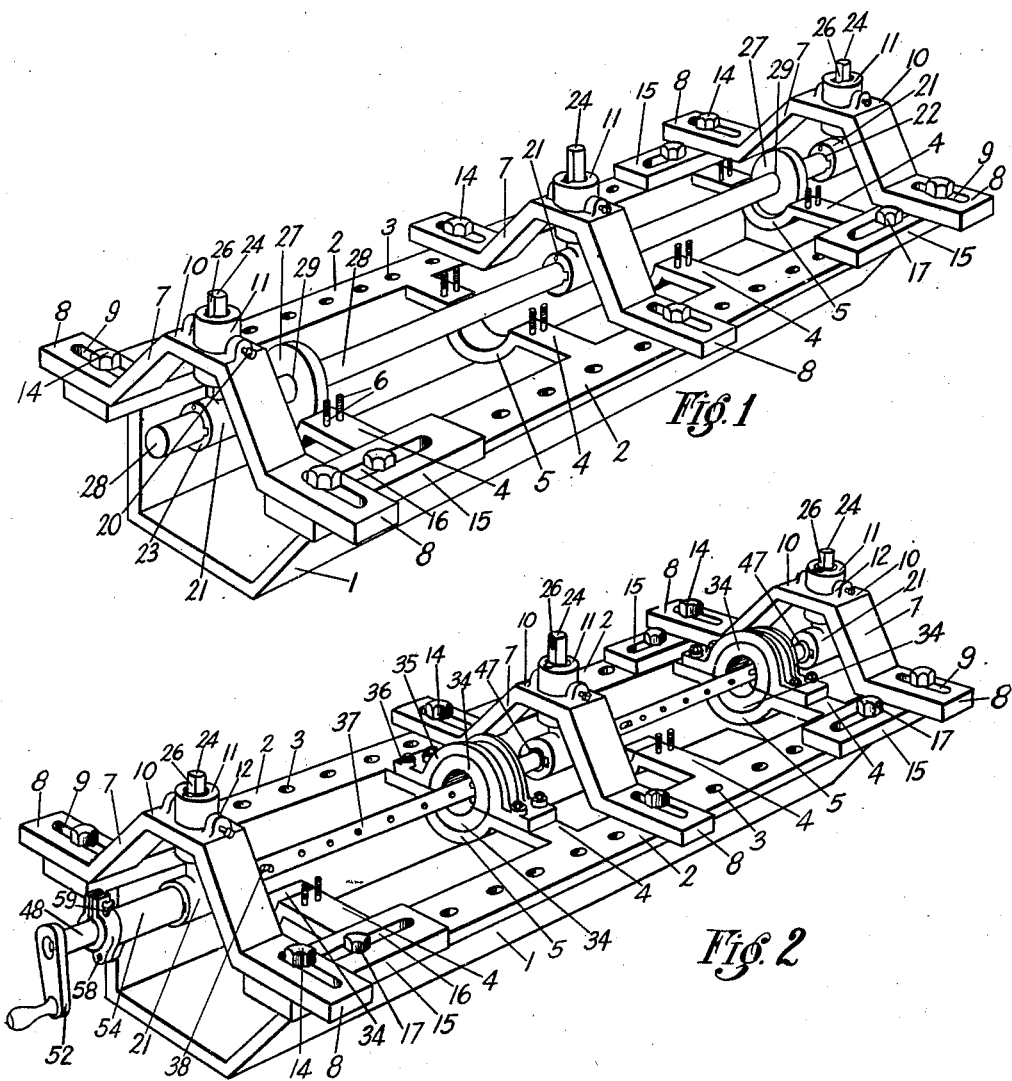
Frederick A. Litter
INVENTOR.
BY
ATTORNEY.

June 24, 1930.  F. A. LITTER  1,767,384
BEARING BORING APPARATUS
Filed April 21, 1926  2 Sheets-Sheet 2

Frederick A. Litter
INVENTOR.

BY
ATTORNEY

Patented June 24, 1930

1,767,384

UNITED STATES PATENT OFFICE

FREDERICK A. LITTER, OF COLUMBUS, OHIO

BEARING-BORING APPARATUS

Application filed April 21, 1926. Serial No. 103,582.

My invention relates broadly to a bearing boring apparatus and pertains, more particularly, to the provision of an apparatus for boring the main crankshaft bearings of an automobile engine.

Certain types of apparatus which are at present in use for boring the main bearings of an automobile engine comprise a cutter carrying shaft, bearings for supporting this shaft and bridge pieces adapted to be secured to the engine crankcase for supporting the cutter shaft bearings. In apparatus of this type, the arrangement is such that the position and relative alignment of the cutter shaft bearings is finally determined by the position of the bridge pieces which are secured to the crankcase. If, as is sometimes the case, the crankcase is sprung or warped, or inaccurately machined, the cutter shaft bearings and cutter shaft will be out of alignment when the bridge pieces are secured to the crankcase. This disalignment of the cutter shaft bearings will result in boring disaligned main bearing surfaces and has been the source of much trouble.

A further objectionable feature of the main bearing boring apparatus referred to above is the fact that the cutters must be adjusted after the cutter shaft has been properly positioned with relation to the crankcase. This positioning of the cutter shaft makes the necessarily delicate adjustment of the cutters very difficult and inconvenient and, furthermore, increases the danger of boring inaccurate or disaligned bearing surfaces.

My novel main bearing boring apparatus is of such construction that the cutter shaft bearings may be properly aligned with relation to the main bearing saddles and securely held in position during the boring of the main bearings. Also, my invention provides a main bearing boring apparatus in which strain on the cutter shaft bearings and cutter shaft is eliminated and all main bearings bored in accurate alignment irrespective of whether or not the crankcase is warped, sprung or inaccurately machined.

The principal object of my invention is the provision of a novel method of securing the cutter shaft bearings to the bridge pieces which are attached to the crankcase. For this purpose, I preferably employ a readily fusible substance, such as Babbitt metal or the like, and by pouring this metal or other material between the cutter shaft bearing stems and the cooperating openings in the bridge pieces, after the cutter shaft bearing have been aligned with the main bearing saddles, and the bridge pieces secured to the crankcase, I am able to obtain an accurate alignment of the cutter shaft with the main bearings, regardless of any warped condition of the crankcase that may exist.

A further important object of my invention is the provision of a main bearing boring apparatus of such construction that the cutters carried by the cutter shaft may be accurately adjusted before the cutter shaft is assembled with the cutter shaft bearings. This feature makes possible a very accurate adjustment of the cutters, and this adjustment may be accomplished wherever most convenient for the operator.

A still further object of my invention is the provision of a novel cutter shaft and cutter assembly that embodies means for radially adjusting the cutters and means for securing such cutters in any adjusted position.

Another object of my invention is the provision of an aligning bar or shaft which, in combination with suitable collars, may be employed for aligning the cutter shaft bearings with the main bearing saddles of the crankcase prior to the positioning of the main bearing bushings and cutter shaft.

Other important objects of my invention will be explained in the following detailed description and all features are illustrated in the accompanying drawings wherein similar reference numerals designate corresponding parts in the several figures and wherein:

Figure 1 is a perspective view showing a crankcase and the assembly of the cutter shaft bearings and aligning bar with relation to the main bearing saddles.

Figure 2 is a perspective view showing the same crankcase as is shown in Figure 1 with the aligning bar replaced by the cutter shaft and the main bearing bushings positioned in the crankcase saddles.

Figure 3:
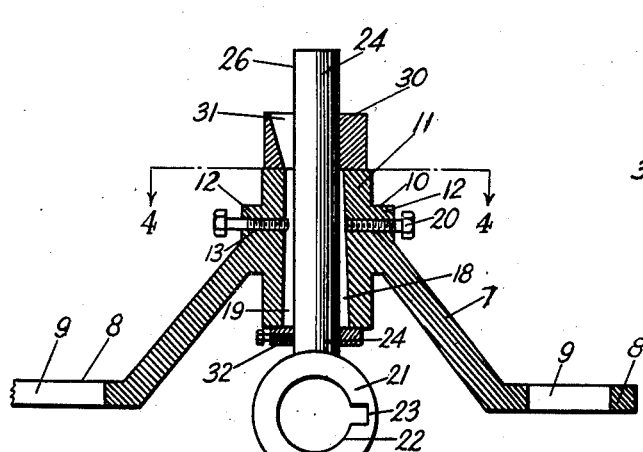
Figure 3 is a transverse vertical sectional view showing the assembly of one of the bridge pieces and cutter shaft bearings.

In the drawings, one illustrative embodiment of my invention is shown in association with the upper half of an automobile crankcase which may be, generally, designated as 1. This crankcase is only shown diagrammatically and comprises side flanges 2 that are provided with openings 3 which normally serve to receive the bolts used for securing the upper and lower halves of the crankcase together. It is also provided with cross members 4 that are formed with semi-cylindrical main bearing bushing saddles 5. Stud bolts 6 for attaching the bearing caps are provided on opposite sides of the bushing saddles. It will be understood that my invention may also be used in connection with engines having the upper half of the crankcase cast integral with the engine block and that its usefulness is not confined to automobile engines.

With particular reference to Figures 1, 2, 3 and 4, it will be seen that I have provided a plurality of bridge pieces 7. These bridge pieces are, preferably, formed with horizontally extending attaching portions 8 that are provided with slotted openings 9, relatively flat top portions 10 formed with bosses 11 and projections 12 which are provided with internally threaded openings 13. The bridge pieces may be suitably distributed over the length of the crankcase and secured in place by bolts 14 which engage with the openings 3 in the crankcase side flange 2. If the crankcase is too short for the proper spacing of the bridge pieces, additional parts 15 having slots 16 may be secured to the crankcase side flanges by bolts 17 and then the attaching portions of the end bridge pieces secured to the projecting ends of these parts. This feature of my invention provides in adjustability which makes possible the use of my bearing boring apparatus with engines of different designs and sizes. The bosses 11 are formed with downwardly and outwardly tapering openings 18 and keyways 19, and the internally threaded openings 13 formed in the projections 12 are fitted with stud bolts 20 that extend into the openings 18, as best shown in Figure 3.

The cutter shaft bearings 21 are provided with central openings 22, recesses 23 and stems 24 formed with flat portions 26. The stems 24 of the cutter shaft bearings 21 fit loosely through the openings 18 in the bridge pieces and, when so positioned, are free to move in all directions with relation to the bridge piece openings 18.

In the assembly of so much of my apparatus as has just been discussed, the bridge pieces are secured to the crankcase in the manner shown in Figures 1 and 2, the annular collars 27 are placed in the end bearing saddles 5, the stems 24 of the cutter shaft bearings 21 are positioned in the openings 18 of the bridge pieces and then the aligning bar 28 is slipped through the openings 22 of the cutter shaft bearings and the central openings 29 of the collars 27. It is preferable to use the end main bearing saddles for aligning of the cutter shaft bearings to ensure that the timing gears will mesh properly when the main bearings have been bored and the crank shaft put in place. The aligning bar 28, preferably, fits snugly in the openings 22 of the cutter shaft bearings 21 and the central openings 29 of the annular collars 27. When this assembly has been made, the aligning shaft 28 and the cutter shaft bearings 21 will be in exact alignment with the main bearing saddles 5 of the cross members 4. The stems 24 of the cutter shaft bearings 21 will, at this time, be free to move in the openings 18 of the bridge pieces 7 in any direction which may be necessary to allow correct alignment of the aligning bar 28 and cutter shaft bearings 21 with the annular collars 27 and the main bearing saddles 5. The stems 24 of the cutter shaft bearings may stand vertically or at an angle to the vertical without affecting the alignment of the cutter shaft bearings or the aligning shaft. It will be understood that the annular collars 27 may be of different sizes to fit different engines, and of such relative dimensions that the centers of the cutter shaft bearings will be coincident with the centers of the crankshaft journals. It will be noted that the correct alignment of the aligning shaft and the cutter shaft bearings is, also, not affected by the position of the bridge pieces or by the condition of the crankcase side flanges to which the bridge pieces are secured.

Figure 5:
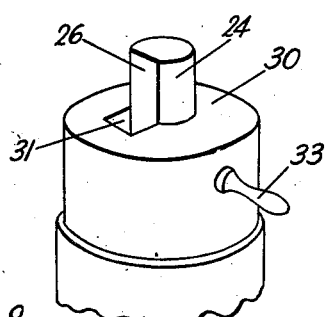
Figure 5 is a fragmentary perspective view of the pouring and cutting funnel used in pouring the babbitt between the walls of the bridge openings and cutter shaft bearing stems.

When the bridge pieces 7, annular collars 27, aligning bar 28 and cutter shaft bearings 21 have been assembled, as just described, the funnels 30 (see Figures 3 and 5) may be positioned over the projecting ends of the stems 24 and rested upon the tops of the bosses 11 in such positions that the openings 31 of the funnels, the keyways 19 of the bosses 11 and the flat portions 26 of the stems 24 register with each other. After this, melted babbitt or some other easily melted and, preferably quick-setting material, such as metal, et cetera, may be poured through the openings 31 of the funnels 30 and into the spaces between the openings 18 of the bridge pieces 7 and the stems 24 of the cutter shaft bearings. Some suitable means, such as pieces of pasteboard or collars 32, shown in Figure 3, may be used for preventing the babbitt from escaping out of the bottoms of the openings 18. After the metal has been poured and has slightly set, the funnels 30 may be turned by means of handles 33 to shear off the babbitt between the funnels 30 and the tops of bosses 11 so that the babbitt is flush with the tops of the bosses 11. The metal poured between the walls of the openings 18 and the stems 24 will flow around these parts and the stud bolts 20 and, also, into the keyways 19 of the bosses 11, thereby forming keys between the flattened portions 26 of the stems 24 and the walls of the keyways 19 to prevent these parts from turning or twisting during subsequent operations. After the metal has set, the stud bolts 20 may be tightened to take care of any shrinkage in the babbitt during cooling, if this is found necessary. It will be obvious that this method of connecting the cutter shaft bearings and bridge pieces has absolutely no tendency to strain any part or in any way disalign the cutter shaft bearings with the main bearing saddles.

The aligning bar 28 may now be slipped out of the bearings 21 and the collars 27 removed from the main bearing saddles. The bearing bushings 34 (Figure 2) may now be placed in the bearing saddles 5 and bearing caps 35 fastened in place by means of the bolts 6 and suitable nuts 36. For purposes of illustration, only two bearing caps are shown in position but I prefer to bore all bearings at the same time. The apparatus is now ready for the insertion of the boring bar or cutter shaft.

Figure 6:
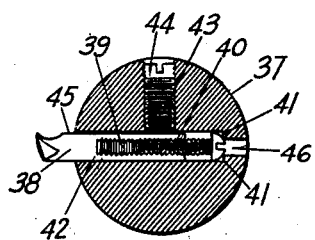
Figure 6 is a transverse vertical sectional view showing the cutter shaft and arrangement for radially adjusting the cutters and securing them in any adjusted position.
Figure 4:
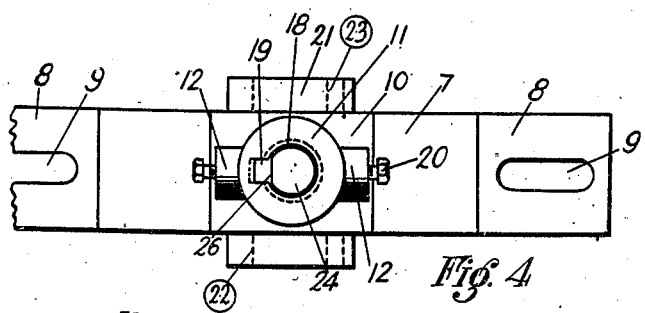
Figure 4 is a fragmentary plan view of one of the bridge pieces and cutter shaft bearings.
Figure 7:
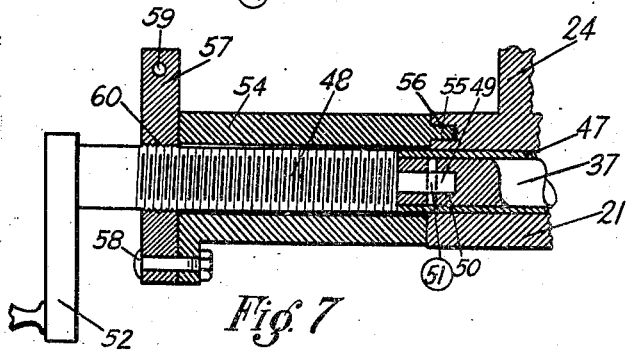
Figure 7 is a fragmentary longitudinal vertical sectional view showing the mechanism for revolving the cutter shaft and feeding the cutters through the main bearings as the boring progresses.

The cutter shaft 37, as shown in Figures 2, 6 and 7 consists of a long, round bar which is provided with suitable cutters 38. The cutters 38 have a cutting head at one end and the opposite ends are provided with internally threaded sockets 39. Screws 40 fit into these sockets (Figure 6) and their heads rest on shoulders 41 formed by boring the openings 42 with two different diameters. At right angles to the openings 42, are the internally threaded opening 43 which carry the set-screws 44 that coact with the flattened sides 45 of the cutters 38. From the description above, it will be obvious that the set-screws 44 may be loosened and the screws 40 manipulated with a screwdriver through the openings 46 to advance or retract the cutters 38 within the openings 42. When in any adjusted position, the cutters may be secured by means of the set-screws 44. The cutter shaft is, preferably, provided with a plurality of openings for the cutters so that these may be adjusted in accordance with the bearing positions of the different engines.

When the cutters have been adjusted to travel in a circle of the same diameter as the crank shaft journals, the cutter shaft may be assembled with the cutter shaft bearings. Since the cutter shaft is of less diameter than the aligning bar and the openings 22 in the cutter shaft bearings 21, it is necessary to fit sleeves over the cutter shaft to make up for this difference in size. These sleeves are shown, as at 47 in Figures 2 and 7, and they are, preferably, placed upon the cutter shaft before the cutters are placed or adjusted. The cutter shaft may be slipped into the openings 22 of the cutter shaft bearings 21 and, because of its smaller size, it may be positioned eccentrically of these openings and, also, of the openings through the main bearings to allow the adjusted cutters to pass freely. The recesses 23 formed in the cutter shaft bearings are for the purpose of allowing the adjusted cutters to pass freely, when adjusted to cut in a circle of the desired diameter. The eccentric positioning of the cutter shaft during assembly is sufficient to permit the adjusted cutters to pass freely through the main bearing bushings. After the cutter shaft has been put in place, the sleeves 47 may be slid longitudinally of the cutter shaft until within the openings 22 of the cutter shaft bearings. The apparatus is now ready for the main bearing boring operation.

For the purpose of turning the cutter, shaft and drawing or feeding it through the main bearings, I provide a shaft 48 which is formed with a projecting portion 49 that may be secured within the socket 50 in the end of the cutter shaft 37 by means of a pin 51. On its opposite end this shaft 48 may be equipped with a crank 52. The shaft 48 is threaded as at 53 and surrounding this shaft is a sleeve 54 that has a pin 55 engaging with a recess 56 in the end of one of the cutter shaft bearings 21, as shown in Figure 7. The other end of this sleeve 54 is provided with the split nut 57, the parts of which are hinged as at 58 and secured together at their tops by the bolt and wing nut 59. The threaded portions 60 of this split nut are adapted to engage with threads on the shaft 48 so that, as the shaft 48 and the cutter shaft 37 are revolved, the cutter shaft will be pulled longitudinally to draw the cutters through the main bearings being bored. One or more passes through the bearings may be made, as found necessary, and when the main bearing boring has been completed, the apparatus may be disassembled from the crankcase and the crank shaft placed in position.

The openings 18 through the bosses 11 are tapered to facilitate removal of the babbitt or other material after the apparatus has been removed from the crankcase and the funnels are adapted to shear off this material flush with the tops of bosses 11 for the same purpose.

From the foregoing description, it will be apparent that I have provided a novel apparatus whereby the main bearings of an engine may be bored in accurate alignment and in such a manner that the timing gears will mesh properly after completion of the boring and positioning of the crank shaft. It will, furthermore, be apparent that I have provided a novel method of aligning the cutter shaft bearings with the main bearing saddles and for retaining such bearings in correct alignment during the boring of the main bearing bushings. Also, it will be obvious that the alignment of the cutter shaft bearings may be made independently of any crankcase irregularities and that the cutter shaft, with cutters adjusted, may be readily assembled with relation to the other parts of the apparatus. The feed mechanism for pulling the cutters longitudinally as the bearing boring progresses, is an additional and important feature of my invention.

Because of the fact that my apparatus accomplishes an accurate alignment of the cutter shaft bearings with respect to the main bearing saddles and, because of the further fact that this alignment may be obtained and maintained irrespective of any defects in the crankcase side flanges and without straining any part of the boring apparatus or crankcase, I am enabled to bore the main bearings in exact alignment and to accurate dimensions in a minimum length of time.

Having thus described my invention, what I claim is:

1. Main bearing boring apparatus comprising bridge pieces having openings, cutter shaft bearings having stems adapted to interfit with said openings, means for aligning said cutter shaft bearings and melted material means for embracing said stems in the openings to maintain said cutter shaft in alignment.

2. The method of boring bearings comprising aligning stemmed boring shaft bearings by an aligning shaft, fixing the alignment of such bearings by introducing a fusible metal into contact with the stems thereof and then substituting a boring shaft for the aligning shaft.

3. Main bearing boring apparatus comprising cutter shaft bearings having members thereon, means for aligning the bearings, and a fusible metal means cooperating with said members for maintaining the alignment of the bearings.

4. Main bearing boring apparatus comprising cutter shaft bearings having members thereon, means for aligning the bearings, a fusible metal means cooperating with said members for maintaining the alignment of the bearings, and a funnel structure associated with said bearings.

5. Main bearing boring apparatus comprising cutter shaft bearings having members thereon, means for aligning the bearings, a fusible metal means cooperating with said members for maintaining the alignment of the bearings, a funnel structure associated with said bearings, said funnel structure being of a nature to eliminate the excess melted material.

6. Main bearing boring apparatus comprising supporting members having openings, shaft bearings having stems adapted to interfit with said openings, and melted material means embracing said stems in said openings to maintain said bearings in alignment.

7. Main bearing boring apparatus comprising supporting members having openings, shaft bearings having stems adapted to interfit with said openings, means for aligning said bearing to position same for the reception of a boring device, melted material means embracing said stems in said opening to maintain said bearing in alignment, and a boring device adapted to be mounted in said bearings.

8. Main bearing boring apparatus comprising supporting members having openings, shaft bearings having stems adapted to interfit with said openings, means for aligning said bearings to position same for the reception of a boring device, melted material means embracing said stems in said openings to maintain said bearings in alignment, a boring shaft of smaller diameter than said bearings adapted to be mounted in said bearings, and a sleeve between said bearings and said boring shaft.

9. Main bearing boring apparatus comprising supporting members, cutter shaft bearings having members thereon, and means for supporting said cutter shaft bearings upon said supporting members and fixing the position of such members in any relation thereto which is demanded by proper alignment of said bearings, said last-named means embodying a fused metal packing adapted to engage the members on said bearings to firmly hold said bearings in such position of proper alignment.

10. The combination with a crank case having main bearing saddles, of collars adapted to rest in said saddles, a shaft adapted to be mounted in said collars, bearings having members thereon for said shaft, supports for said bearings, the members on said bearings being so mounted upon said supports as to be capable of movement freely in any direction thereby enabling the bearings to be shifted to any postion demanded by proper alignment thereof, and means for securing the bearings in the aligned position.

11. The combination with a crank case having main bearing saddles, of collars adapted to rest in said saddles, a shaft adapted to be mounted in said collars, bearings having members thereon for said shaft, supports for said bearings, the members on said bearings being so mounted upon said supports as to be capable of movement freely in any direction thereby enabling the bearings to be shifted to any position demanded by proper alignment thereof, means for securing the bearings in the aligned position, and a cutter shaft.

12. Bearing boring apparatus comprising a cutter shaft, bearings having members thereon for said shaft, supports for said bearings, the members on said bearings being so mounted upon said supports as to be capable of movement freely in any direction thereby enabling the bearings to be shifted to any position demanded by proper alignment thereof, means for securing the bearings in the aligned position, means for revolving said shaft, and means for moving it longitudinally, said last named means comprising means on one end for engaging said revolving shaft and parts for engaging one of said cutter shaft bearings on the other end.

13. Main bearing boring apparatus comprising supporting members, cutter shaft bearings having members thereon, the members on said cutter shaft bearings being so mounted upon said supporting members as to be capable of movement freely in any direction thereby enabling the cutter shaft bearings to be shifted to any position demanded by proper alignment of said bearings, and means co-operating with the members on said cutter shaft bearings for holding said cutter shaft bearings.

14. Main bearing boring apparatus comprising supporting members, cutter shaft bearings having members thereon adapted to co-operate with said supporting members, the members on said cutter shaft bearings being so mounted upon said supporting members as to be capable of movement freely in any direction thereby enabling the cutter shaft bearings to be shifted to any position demanded by proper alignment thereof, and means for engaging the members on said cutter shaft bearings to fix the position thereof and affix said members to said supporting members.

15. Main bearing boring apparatus comprising supporting members, cutter shaft bearings having members thereon adapted to co-operate with said supporting members, the members on said cutter shaft bearings being so mounted as to be capable of movement freely in any direction thereby enabling the cutter shaft bearings to be shifted to any position demanded by proper alignment thereof, and means for engaging the members on said cutter shaft bearings to fix the position thereof, each of said cutter shaft bearings having a recess therein.

In testimony whereof I hereby affix my signature.

FREDERICK A. LITTER.